Sept. 28, 1943.  R. Y. CASE  2,330,405

POWER TRANSMISSION BELT

Filed April 14, 1941

Inventor
Richard Y. Case
By
Attorney

Patented Sept. 28, 1943

2,330,405

UNITED STATES PATENT OFFICE 2,330,405

POWER TRANSMISSION BELT

Richard Y. Case, Philadelphia, Pa., assignor to L. H. Gilmer Co., Tacony, Philadelphia, Pa., a corporation of New Jersey Application April 14, 1941, Serial No. 388,540

6 Claims. (Cl. 154—4)

My invention relates to wrappers for what is commonly known as power transmission belts, either V-shape or flat.

As far as is known, wrappers for V-shaped belts are made and have been made of woven material cut on the bias. The material is cut on the bias so that it will have an ultimate elongation of approximately fifty percent which is required for a V belt wrapper.

One of the objections to the bias cut wrapper is that it is made in lengths and when placed on the belt the ends are over-lapped, which overlap frequently becomes loosened whereby the wrapper has a tendency to loosen around the body of the belt. Another objection to this overlap is that it increases the weight of the belt at that particular point, or zone, of overlap, which is objectionable in belts running at high speed and causes the belt to become overbalanced at that point, or zone. The overlap also causes a stiff section in the belt.

One object of my invention is to provide a belt comprising an endless belt carcass having an endless jacket or wrapper consisting of an endless elastic band of initially less length than the carcass and formed of straight cut woven or knitted material of high stretch capacity, said band being stretched to an elongated state and under tension over the carcass and being wrapped about and secured in such state to the carcass, whereby all of the above-stated objections to bias-cut wrappers are avoided and a belt wrapper having the proper extent of ultimate elongation required produced.

Another object of my invention is to provide a novel method of making and applying a jacket or wrapper of this character to a belt carcass.

Figure 5:
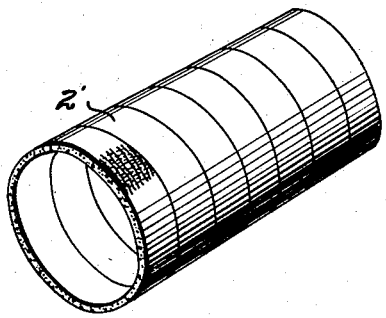
Figure 5 is a perspective view of a tube of straight woven fabric processed from which wrappers for my belt are cut in endless bodies.
Figure 6:
Figure 6 is a detail sectional view of the straight woven fabric.

The reference numeral 2 in Figs. 1 to 4, inclusive, designates my improved knitted fabric belt wrapper secured to the carcass 3 of the belt which may be made of rubber and a suitable neutral axis pulling element, the side edges of the wrapper being brought together with a butt joint 1 extending circumferentially around the belt. Figs. 5 and 6 show a similar wrapper 2' formed of woven fabric and applied to the carcass 3 of the belt in the same manner.

According to my invention, the wrapper comprises an endless durable woven material or band of durable straight cut knitted material. The wrapper may be processed, in part, with the process fully set forth in the United States Letters Patent No. 2,153,963, dated April 11, 1939. For instance, the construction of the woven or knitted material may be changed and either the soda lye and washing treatment, or the caustic soda treatment, or both, may be eliminated or a suitable treatment to increase yarn absorbency may be used if desired.

It has been found that straight cut woven material has an ultimate elongation of approximately twenty percent, which is not sufficient elongation for a power transmission belt wrapper. By the process disclosed herein I shrink the material approximately up to thirty-three and one-third percent, which, added to the initial twenty percent, produces an endless straight cut durable woven, or durable knitted, material with an ultimate elongation of approximately up to fifty-three and one-third percent, thereby making the endless material adaptable for use as a V-belt wrapper.

This material, according to my invention, is then impregnated with a suitable compound such as a rubber compound and vulcanized to the carcass of the belt.

When wrapped around the body of the belt all transverse joints are eliminated, the only joint being circumferential, and preferably a butt joint 1.

The elasticity of the straight cut woven or knitted material, as described herein, is sufficient to compensate for the small elongations to which a V-shaped belt is subjected during its normal period of service.

The treatment, or processing, of this straight cut woven or knitted material, facilitates regular manufacturing operations, especially with respect to the contracting and swelling treatment and to the impregnation, as well as to vulcanization of the wrapper to the belts. By this process the material is susceptive to transverse stretching which is important in its application to the belt carcass for vulcanizing.

The straight cut woven or knitted material, treated by this method is, as above stated, impregnated with a compound by any known method capable of insuring an effective penetration of the compound into the fabric and filling the interstices in the material.

This penetration can be greatly facilitated by the fact that the fibers of the elements composing a fabric are not compressed one against another. The impregnation can be performed by means of a compound in solution in a solvent, or even by a compound in colloidal suspension.

Belt wrappers, according to my invention, besides being produced at a very low net cost, have the advantage of possessing high residual elasticity, as well as remarkable qualities of rotproofness and resistance to wear. A particular important application of my invention consists in producing straight cut woven or knitted wrappers made with an initial length so as to have, when it is in place upon the belt carcass, the desired fitting tension.

Due to the fact that the straight cut woven or knitted material replaces the usual bias cut woven material, the belt is further improved because the original strength of the material is maintained which is not the case with bias cut material.

Figure 1:
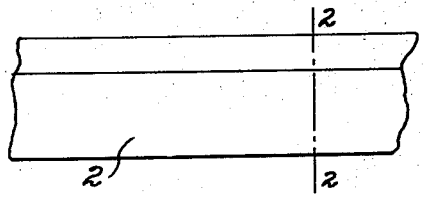
Figure 1 is a top plan view of an endless power transmission belt embodying my invention.
Figure 2:
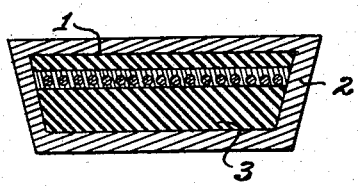
Figure 2 is a vertical transverse sectional view on line 2—2 of Figure 1 through a portion of the belt.
Figure 3:
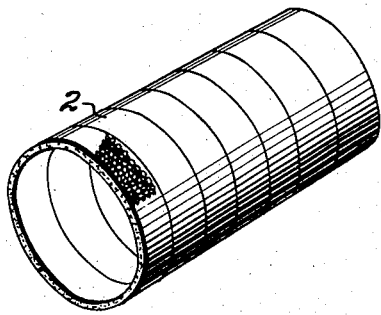
Figure 3 is a perspective view of a tube of knitted fabric processed from which wrappers for my belt are cut in endless bodies.
Figure 4:
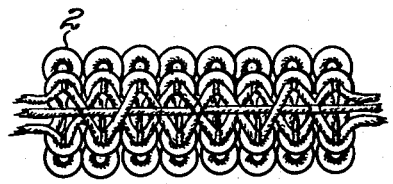
Figure 4 is a detail sectional view of the knitted fabric.

As shown in Figs. 3 and 5, the tubular knitted fabric 2 or straight woven fabric 2' is made on a tubular knitting machine or loom in long lengths. The processing treatment is preferably performed while the material is still in long lengths. After all processing on the material is completed, the tubular processed fabric is circumferentially cut, as shown by the lines of cut in Figs. 3 and 5, into wrapper bands or jackets of the desired width or widths. The processing treatment may, however, be performed upon individual wrapper bands or jackets after they are formed, and my invention contemplates either of these modes of treatment.

What I claim is:

1. The combination, in a power transmission belt, of an endless belt carcass, and a jacket comprising an endless band of initially less length than the carcass and formed of straight cut woven or knitted material of high stretch capacity, said band being stretched to an elongated state over and being wrapped about and vulcanized under tension to the carcass with its longitudinal edges abutting longitudinally of the belt.

2. The method of making an endless power transmission belt, comprising a carcass and a wrapper, which consists in forming an endless tubular body of straight cut woven or knitted material having a predetermined diameter and normal ultimate capacity of elongation, then processing the body to effect its shrinkage and reduce its diameter and to give it an ultimate capacity of elongation greater than its ultimate capacity of elongation before shrinkage, then dividing the body into endless jacket bands of a desired width or widths, and then stretching and wrapping a band so formed about and fixing it to a suitably formed endless carcass.

3. The method of making an endless power transmission belt, comprising a carcass and a wrapper, which consists in forming an endless tubular body of straight cut woven or knitted material having a predetermined diameter and normal ultimate capacity of elongation, then processing the body to effect its shrinkage and reduce its diameter and to give it an ultimate capacity of elongation greater than its ultimate capacity of elongation before shrinkage, then impregnating the body with a suitable vulcanizable material, then dividing the body into endless jacket bands of a desired width or widths, and then stretching and wrapping a band so formed about and vulcanizing it to a suitably formed endless carcass.

4. The method of making an endless power transmission belt, comprising a carcass and a wrapper, which consists in forming an endless tubular body of straight cut woven or knitted material having a normal ultimate capacity of elongation of about 20%, then processing the body to effect its shrinkage approximately 35% and to reduce its diameter and give it an ultimate capacity of elongation of about 50%, then dividing the body into endless jacket bands of a desired width or widths, and then stretching and wrapping a band so formed about and vulcanizing it to a suitably formed endless carcass.

5. The combination, in a power transmission belt, of an endless belt carcass, and a jacket comprising an endless elastic band of initially less length than the carcass and formed of straight cut woven or knitted material of high stretch capacity, said band being stretched to an elongated state and under tension over the carcass and being wrapped about and secured in such state to the carcass.

6. The combination, in a power transmission belt, of an endless belt carcass, and a jacket comprising an endless elastic band of initially less length than the carcass and formed of rubber impregnated straight cut woven or knitted material of high stretch capacity, said band being stretched to an elongated state and under tension over the carcass and being wrapped about and vulcanized in such state to the carcass.

RICHARD Y. CASE.